United States Patent
Arbusti

(10) Patent No.: US 6,332,591 B1
(45) Date of Patent: Dec. 25, 2001

(54) METHOD OF SIMULATING EXTERNAL THERMAL FLUXES ABSORBED BY EXTERNAL RADIATING COMPONENTS OF A SPACECRAFT IN FLIGHT, AND SPACECRAFT FOR IMPLEMENTING THE METHOD

(75) Inventor: Francis Arbusti, Cannes la Bocca (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/502,230

(22) Filed: Feb. 11, 2000

(30) Foreign Application Priority Data

Mar. 11, 1999 (FR) .................................................. 99 02995

(51) Int. Cl.[7] ...................................................... B64G 7/00
(52) U.S. Cl. ............................................................ 244/163
(58) Field of Search ................................ 244/158 R, 163, 244/121, 134 D; 250/493.1, 495.1, 504 R; 434/38

(56) References Cited

U.S. PATENT DOCUMENTS

| | | | |
|---|---|---|---|
| 3,227,879 | * | 1/1966 | Blau et al. . |
| 3,374,830 | * | 3/1968 | O'Sullivan, Jr. ..................... 244/163 |
| 4,546,983 | * | 10/1985 | Rosa .................................. 273/348.1 |
| 4,726,688 | * | 2/1988 | Ruel ....................................... 374/29 |
| 4,801,113 | * | 1/1989 | Engelhardt ........................... 244/121 |
| 4,802,929 | * | 4/1989 | Modisette et al. ............... 250/504 R |
| 5,799,904 | * | 9/1998 | Goodzeit et al. ..................... 244/163 |

OTHER PUBLICATIONS

Weydandt, J.; Bweckman, K.: "Large Spacecraft and Related Verification Aspects of the Thermal Design" 14th Intersociety Conference on Environments Systems. Jul. 16–19, 1984, XP002121116 San Diego, CA USA.

Kim, J.H.; Hyman, N. L.: "Clementine Thermal Design and Verification Testing: Quick, Cheap, Unusual, Successful" 26th International Conference on Environmental Systems, Jul. 8–11, 1996, XP002121117, Monteray, CA, USA.

Wingate, C. A.: "Thermal Balance Testing with Infrared Shrouds, An Economical Alternative to Solar Simulation" 35th Congress of the International Astronautical Federation, 1984, XP002121118 Lousanne, Suisse.

* cited by examiner

*Primary Examiner*—Galen L. Barefoot
(74) *Attorney, Agent, or Firm*—Sughrue Mion, PLLC

(57) ABSTRACT

During a thermal equilibrium test, the heating of components of a spacecraft such as a satellite by albedo, terrestrial infrared and solar thermal fluxes is simulated by placing the craft directly in a vacuum chamber whose walls are cooled to a low temperature to represent the space environment. The simulation is effected by heating devices integrated between the panels forming the external structure of the spacecraft and external radiating components opposite the equipment units which dissipate heat. The heating devices, which are preferably electrical devices, remain in place on the spacecraft in flight.

8 Claims, 2 Drawing Sheets

METHOD OF SIMULATING EXTERNAL THERMAL FLUXES ABSORBED BY EXTERNAL RADIATING COMPONENTS OF A SPACECRAFT IN FLIGHT, AND SPACECRAFT FOR IMPLEMENTING THE METHOD

TECHNICAL FIELD

The invention relates primarily to a method of simulating on the ground the external thermal fluxes absorbed in flight by each of the external radiating components of a spacecraft such as an artificial satellite or a space probe.

The invention also relates to a spacecraft designed to enable simulation of external thermal fluxes absorbed by these external radiating components in flight without it being necessary to use a mock-up.

PRIOR ART

Spacecraft such as artificial satellites and space probes are exposed in flight to external thermal fluxes such as albedo, infrared flux from the Earth and solar flux.

To protect the onboard equipment of a spacecraft from these external thermal fluxes, it is standard practice to cover most of the exterior surfaces of its structure with a thermally insulative material. This material, commonly referred to as "super insulation", is generally in the form of a stack of films of an insulative plastics material such as Kapton®.

Also, some of the equipment on board a spacecraft dissipates heat when in operation. This equipment requires special treatment to prevent overheating inside the spacecraft.

This treatment consists in doing everything possible to enable each equipment unit concerned to be mounted directly against the inside faces of the panels forming the outside structure of the spacecraft, a window to be formed in the super insulation in register with the equipment unit, and an external radiating component to be attached to the outside surface of the panel at the location of the window.

The external radiating components contribute to passive thermal control of the spacecraft. Their functions are to evacuate heat given off by the equipment and to minimize heating of the spacecraft due to external thermal fluxes (albedo, terrestrial infrared and solar fluxes). To this end, they radiate infrared strongly and reflect most external radiation. For example, existing external radiating components generally have an infrared emissivity close to 0.80 and an albedo and solar radiation absorption coefficient that changes from around 0.1 at the start of the mission to around 0.2 at the end of the mission.

The radiating components used on spacecraft consist of plastics material film metallized on its outside face, for example. The plastics material of the film can be polyfluoro-ethylene propylene, Kapton®, or Mylar®. The metal is generally aluminum or silver.

When a spacecraft is designed and built, many tests are carried out to verify that it will be able to fulfill its mission for the required period of time after launch, and these tests include a spacecraft thermal equilibrium test.

The thermal equilibrium test simulates heating of the component parts of the spacecraft by external thermal fluxes that the spacecraft absorbs in flight.

A first technique known in the art for testing the behavior of a spacecraft in the presence of external thermal fluxes that it absorbs in flight consists in placing a mock-up of the craft in a vacuum chamber which is equipped with a solar simulator and is cooled to a very low temperature to simulate the space environment.

However, that technique has the drawbacks of being complicated, slow and costly, and of being unable to simulate all thermal fluxes. It is in fact limited to solar fluxes and cannot simulate the albedo and terrestrial infrared fluxes that predominate in low Earth orbit.

A second technique known in the art simulates on the ground the albedo, terrestrial infrared and solar fluxes encountered by the spacecraft in flight by installing radiating tubes for heating the outside faces of the spacecraft in a thermal test facility. However, that technique has the drawback that it cannot be used for qualification of the thermal behavior of the spacecraft. This is because its lack of protection rules out perfect reproduction of the thermal fluxes in the environment of the spacecraft.

A third technique known in the art simulates on the ground the albedo, terrestrial infrared and solar fluxes encountered by the spacecraft in flight by installing test heaters on the spacecraft, attached to the inside or outside surfaces of its radiating panels.

However, attaching test heaters to the inside face of the radiating panels generally rules out perfect reproduction of the albedo, terrestrial infrared and solar fluxes encountered by the spacecraft in flight. This is because layout constraints rule out arranging the heaters on the surface in the uniform manner that would be necessary to reproduce perfectly the thermal phenomena concerned.

Furthermore, if the test heaters are attached to the outside surfaces of the radiating panels (a technique known in the art and described in particular in the article "Clementine Thermal Design and Verification Testing: Quick, Cheap, Unusual, Successful" by J. H. Kim et al., published in "S.A.E. Technical Paper Series"—"$26^{th}$ International Conference on Environmental Systems, Monterey, Calif."—Jul. 8–11, 1996), the thermo-optical properties of the craft's radiating panels are lost because of the presence of the heaters. This imposes the use of a dedicated thermal mock-up and building the mock-up considerably increases the test preparation time and therefore the cost of the test.

SUMMARY OF THE INVENTION

The object of the invention is to provide a new method of simulating external thermal fluxes absorbed by external radiating components of a spacecraft in flight which reduces the cost and duration of thermal equilibrium tests to be reduced by carrying them out directly on the craft to be launched into space and without using a solar simulator.

According to the invention, this object is achieved by means of a method of simulating external thermal fluxes absorbed by at least one external radiating component of a spacecraft in flight, the method consisting in integrating heating means between said external radiating component and a panel carrying it and using the heating means to simulate said fluxes.

Because the heating means for simulating the external thermal fluxes are integrated between the radiating components and the panels which carry them, the particular properties of the radiating components are not disturbed by the heating means. Consequently, the heating means can be integrated directly into the flight model of the spacecraft, and no a mock-up is needed. This significantly reduces the cost and duration of the tests.

A preferred embodiment of the invention uses electrical heating means connected by electrical conductors to an external electrical power supply to simulate the external thermal flux.

The heating means are left in place when simulation of the external thermal flux is completed, the electrical conductors are cut and electrical connectors of the heating means are connected to the spacecraft earth.

The heating means are preferably integrated in a single operation during mounting of the external radiating component on the panel.

In this case a first film of adhesive, parallel heating strips forming the heating means, a second film of adhesive and the external radiating component are placed on the panel in succession and pressure is applied to the resulting assembly to bond it, for example using a vacuum vessel.

The invention also provides a spacecraft having a structure including panels of which at least one panel carries at least one external radiating component on an external face, wherein heating means used to simulate external thermal fluxes absorbed by said external radiating component in flight are permanently integrated between that component and the panel which carries it.

The heating means, which are electrical heating means in a preferred embodiment of the invention, preferably include parallel heating strips whose ends are connected together by electrical connectors beyond the peripheral edges of the radiating component.

BRIEF DESCRIPTION OF THE DRAWINGS

A preferred embodiment of the invention are described below by way of non-limiting example and with reference to the accompanying drawings, in which.

DETAILED DESCRIPTION OF THE PREFERRED EMBODIMENT OF THE INVENTION

Figure 1:
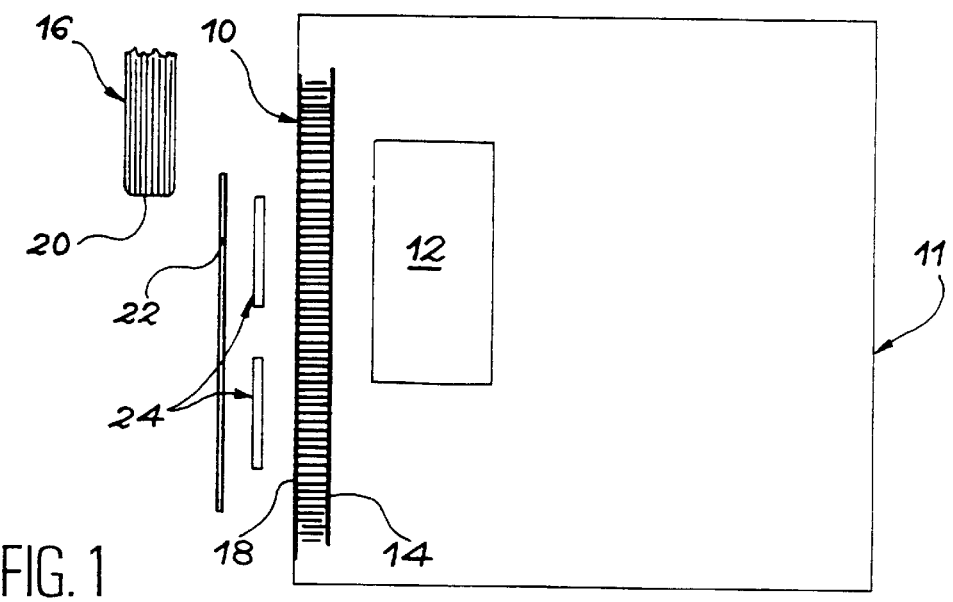
FIG. 1 is an exploded sectional side view which shows in a highly diagrammatic form a portion of a spacecraft designed to enable implementation of a method according to the invention.

FIG. 1 shows a portion of a panel 10 forming part of the external structure of a spacecraft 11 such as a satellite. The panel 10 is usually a sandwich panel which has a honeycomb core 10a (FIG. 2) each face of which is covered with a skin 10b, 10c. Note that the honeycomb core 10a can instead be replaced by a cellular foam core. The skins 10b, 10c and the core 10a of the panel 10 are made of aluminum, for example.

An equipment unit 12 which dissipates heat in operation is fixed to the inside face 14 of the panel 10. The means employed to fix the equipment unit 12 to the panel 10 are well-known to the skilled person and do not form part of the invention. For simplicity, they are not shown in the figure.

Figure 2:
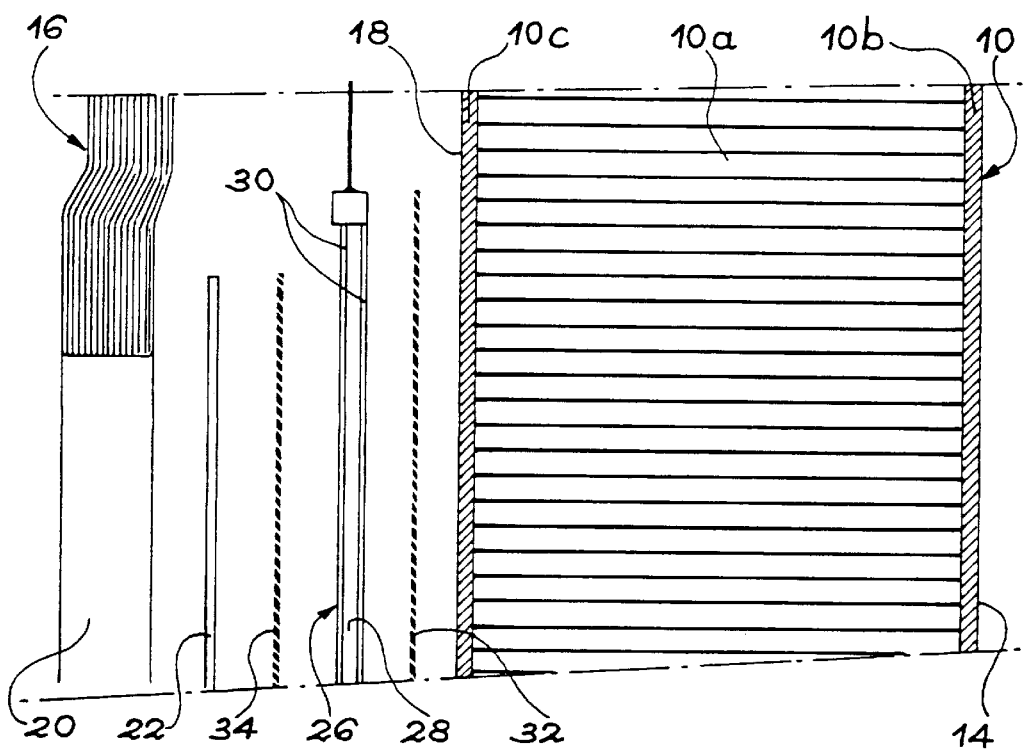
FIG. 2 is an exploded sectional side view which shows to a larger scale the layout of heating means used in a method according to the invention.

As shown diagrammatically in FIGS. 1 and 2, the greater part of the outside surface 18 of the panel 10 is covered with thermal insulation 16 generally referred to as "super insulation". As already mentioned, the super insulation 16 is made up of a large number of layers of films of an insulative material such as Kapton®. The means employed to fix the super insulation 16 to the outside surface 18 of the panel 10 are well-known to the skilled person and do not form part of the invention. They are therefore not shown in the figures, to simplify them.

Opposite the equipment unit 12 is a window 20 in the super insulation 16 enabling heat dissipated by the equipment unit in operation to be evacuated from the spacecraft.

An external radiating component 22 is placed on the outside face 18 of the panel 10 opposite the equipment unit 12 and the window 20. To be more precise, the external radiating component 22 covers all the outside surface 18 of the panel 10 exposed by the window 20 and extends slightly under the super insulation 16 in the vicinity of its edge delimiting the window 20.

As already mentioned, the external radiating component 22 evacuates by radiation most of the heat dissipated as infrared by the equipment unit 12 and reflects outwards most of the incident albedo, terrestrial infrared and solar radiation fluxes. To this end the external radiating component 22 is generally a plastics material film metallized on its outside face. The film is made from poly-fluoro-ethylene propylene, Kapton® or Mylar®, for example, and the metal is generally aluminum or silver. The external radiating component 22 usually has an infrared emissivity of about 0.80 and an albedo and solar radiation absorption coefficient which varies from around 0.1 at the start of the mission to around 0.2 at the end of the mission.

In accordance with the invention, heating means 24 are disposed between the external radiating component 22 and the outside surface 18 of the panel 10. The heating means 24 are for simulating heating of the various components of the spacecraft by external thermal fluxes absorbed by the external radiating component 22 in flight. This simulation is part of a thermal equilibrium test carried out on the ground and directly on the spacecraft.

To this end, the spacecraft is placed in a vacuum chamber (not shown) which does not have a solar simulator. The heating means 24 are then operated to simulate the external thermal flux absorbed by the craft throughout its mission in space. When the test is completed, the heating means 24 remain in place between the outside radiating component 22 and the panel 10 of the spacecraft, of which they form an integral part. The particular arrangement of the heating means 24 does not modify the emissivity and reflection properties of the external radiating component 22.

The method according to the invention therefore enables the use of a vacuum chamber which has no solar simulator and makes the construction of a thermal mock-up optional. This achieves a significant saving in cost and time compared to prior art methods.

The technique for integrating the heating means 24 between the external radiating component 22 and the panel 10 will now be described in detail, by way of non-limiting example and with reference to FIGS. 2 and 3.

As shown in those figures, the electrical heating means 24 are advantageously in the form of substantially rectangular heating strips 26. The heating strips 26 are 12 mm or 27 mm wide and less than 800 mm long, for example. They are applied to the outside surface 18 of the panel 10 so that all the adjacent strips are parallel to each other and separated by substantially the same distance.

Each heating strip 26 can be a refractory material film 28 between two insulative films 30 (see FIG. 2). The refractory material of the film 28 can be Inconel®. The insulative material of the films 30 can be Kapton® approximately 25 µm thick. The films 30 are stuck firmly to both sides of the film 28.

For improved adhesion and to eliminate the risk of bubbles forming, the refractory material film 28 and the two insulative films 30 have holes regularly distributed over their surface. For example, circular holes about 1.5 mm in diameter can be formed in the film 28 every 5 mm in the lengthwise direction and in the widthwise direction. In this case, circular holes approximately 0.5 mm in diameter are formed in the insulative films 30 at the center of each of the holes in the film 28.

An electric current flowing through the refractory material film 28 of each of the heating strips 26 dissipates heat to simulate heating of the components of the spacecraft by external thermal fluxes. The degree of heating simulated depends on the value of the current flowing through the refractory material film 28.

As shown diagrammatically in FIG. 2, the heating strips 26 are integrated between the external radiating component 22 and the panel 10 in a single operation during the mounting of the external radiating component 22 on the panel 10.

To be more precise, the outside surface 18 of the panel 10 is first covered with a first film 32 of adhesive. The heating strips 26 are then placed on the panel 10 covered with the first adhesive film 32. The resulting assembly is then covered with a second adhesive film 34. Finally, the external radiating component 22 is placed on the second adhesive film 34.

To bond the assembly, it is covered with a membrane (not shown) which has one or more air extraction valves. The outside edges of the membrane co-operate with the outside surface 18 of the panel 10 around the adhesive area via appropriate seals (not shown). This technique is well-known to the skilled person. Pressure is then applied to the stack comprising the first adhesive film 32, the heating strips 26, the second adhesive film 34 and the external radiating component 22 by evacuating the interior of the membrane by pumping air out through its valves.

Figure 3:
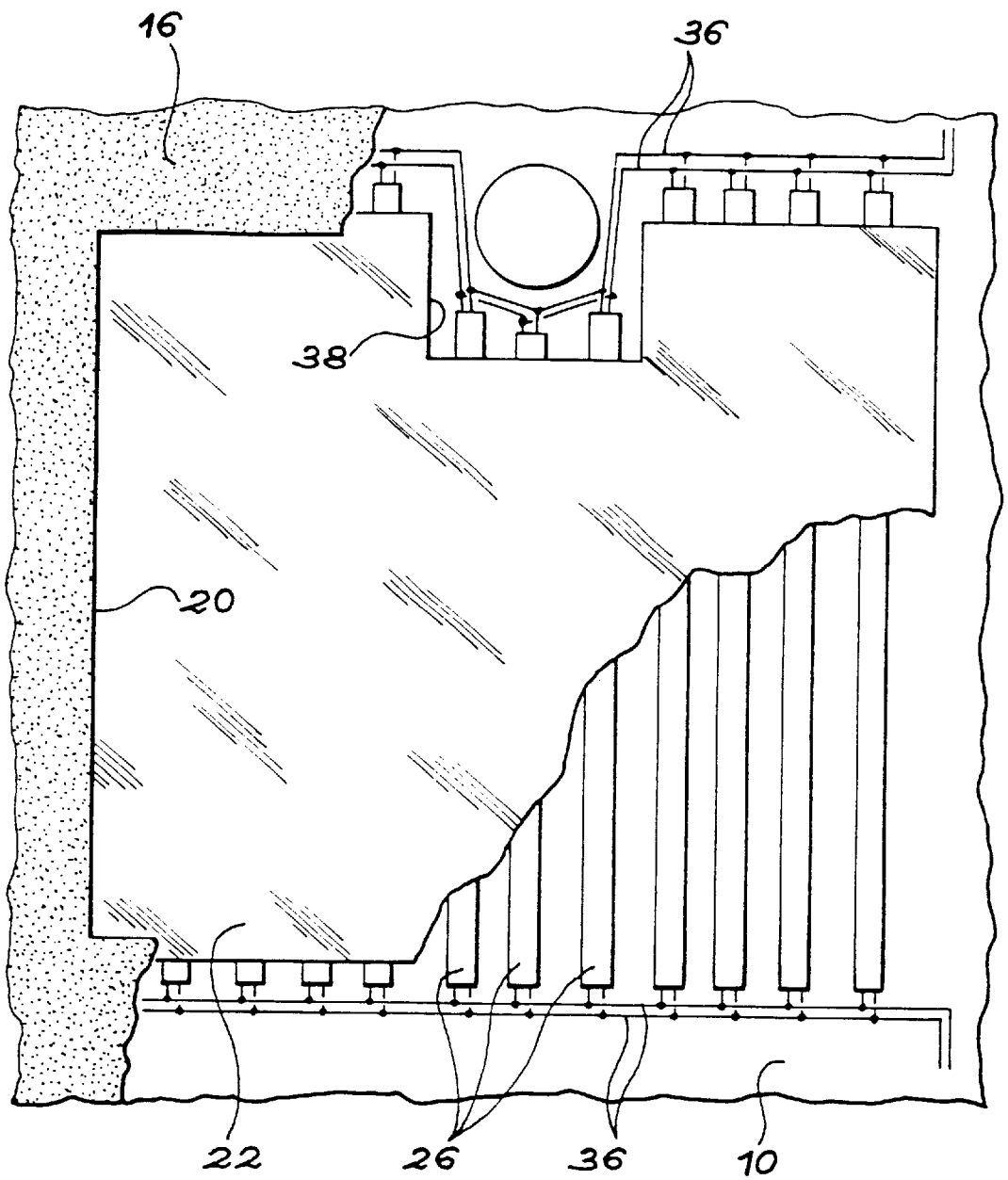
FIG. 3 is a partly cut away front view also showing the layout of heating means used in a method according to the invention.

As shown in FIG. 3 in particular, the external radiating component 22 covers the heating strips 26 but the ends of the heating strips project beyond the outside edges of the component. These ends are connected together by electrical connectors 36 beyond the outside edges of the external radiating component 22. The electrical connectors 36 are used to connect the heating strips 26 to an external electrical power supply (not shown) by means of electrical conductors (not shown) during the thermal equilibrium tests.

When the tests have been completed the power supply electrical conductors (not shown) are cut and the electrical connectors 36 are connected to the spacecraft earth. Only the heating means 24 in the form of the heating strips 26 then remain in place, as previously indicated.

Note that the heating means 24 are integrated between the external radiating component 22 and the panel 10 in a way that enables the external radiating component to be earthed, for example by metallization pins (not shown) between the heating strips 26 which electrically connect peripheral regions of the external radiating component 22 to the outside surface 18 of the panel 10.

As shown diagrammatically in FIG. 3, the parts of the super insulation 16 bordering the window 20 are fitted to the panel 10 when the heating means 24 and the external radiating component 22 have been stuck to the outside face 18 of the panel 10. The edge of the super insulation 16 is fixed directly to the surface 18 of the panel 10 by Velcro® fasteners, for example. They are fixed between the heating strips 26, in areas like the area 38 (FIG. 3) in which there is a gap in the external radiating component 24.

The heating strips 26 are wired in a way that avoids all risk of covering the connections with the super insulation 16 short-circuiting the strips if some of them are disconnected.

Also, after the thermal equilibrium test, the covering of the peripheral edge of the assembly comprising the heating strips 26 and the external radiating component 22 by the super insulation 16 can be adapted to allow for the results of the test.

Of course, the invention is not limited to the embodiment that has just been specifically described by way of non-limiting example only. In particular, the heating means can be of a different kind and/or shape without departing from the scope of the invention.

What is claimed is:

1. A method of simulating external thermal fluxes absorbed by at least one external radiating component of a spacecraft in flight, the method comprising the steps of:
   (A) integrating heating means between said external radiating component and a panel of an external structure of the spacecraft, wherein said heating means are connected to an external power supply;
   (B) operating the heating means to simulate said external thermal fluxes; and
   (C) disconnecting the heating means from the external power supply and leaving the heating means in place between said external radiating component and a panel, when simulation of the external thermal fluxes is completed.

2. A method according to claim 1, wherein in said step (B) said heating means are connected by electrical conductors to said external electrical power supply to simulate the external thermal flux.

3. A method according to claim 2, wherein said step (C) comprises disconnecting said heating means from the external power supply by cutting the electrical conductors, and connecting said heating means to the spacecraft earth via said electrical connectors.

4. A method according to claim 1, wherein said step (A) comprises integrating the heating means in a single operation during mounting of the external radiating component on the panel.

5. A method according to claim 4, wherein said step (A) further comprises placing a first film of adhesive, parallel heating strips forming the heating means, a second film of adhesive and the external radiating component on the panel in succession and applying pressure to the resulting assembly to bond it.

6. A spacecraft comprising:
   at least one panel forming part of an external structure of said spacecraft;
   at least one external radiating component disposed on an external face of said panel;
   heating means permanently integrated between said external radiating component and said panel, said heating means being operable to simulate external thermal fluxes absorbed by said external radiating component in flight and comprising elements which do not modify emissivity and reflection properties of said external radiating component so that said heating means is left in place between said external radiating component and said panel when simulation of the external thermal fluxes is completed.

7. A spacecraft according to claim 6, wherein the heating means are electrical heating means.

8. A spacecraft according to claim 7, wherein the electrical heating means include parallel heating strips whose ends are connected together by electrical connectors beyond the peripheral edges of the radiating component.

* * * * *